(No Model.)

W. S. COOPER.
FRUIT KNIFE.

No. 540,147. Patented May 28, 1895.

Witnesses
E. H. Monroe.
R. M. Smith.

Inventor
William S. Cooper.

By his Attorneys.
C. A. Snow & Co.

UNITED STATES PATENT OFFICE.

WILLIAM STORRS COOPER, OF NEWPORT, RHODE ISLAND.

FRUIT-KNIFE.

SPECIFICATION forming part of Letters Patent No. 540,147, dated May 28, 1895.

Application filed February 23, 1895. Serial No. 539,391. (No model.)

*To all whom it may concern:*

Be it known that I, WILLIAM STORRS COOPER, a citizen of the United States, residing at Newport, in the county of Newport and State of Rhode Island, have invented a new and useful Fruit-Knife, of which the following is a specification.

This invention relates to an improvement in fruit knives, being particularly designed for use in cutting and peeling grape fruit, oranges and lemons or other kinds of fruit which have a thick rind.

The object of my invention is to provide a combined cutting and peeling knife, by means of which an annular groove or kerf may be quickly cut around the orange or lemon, and the rind thereof removed, also making a delicate cutting of peel useful for flavoring, decorating, &c.

My invention consists in the combination with a suitable handle, of a tubular or hollow cylindrical cutting tool or knife, located at one end of said handle, and provided with a gage for regulating the depth of cut, and a curved arm or extension at the other end, which is adapted to be inserted beneath the rind of the orange or lemon for separating the same from the pulp.

Figure 1:
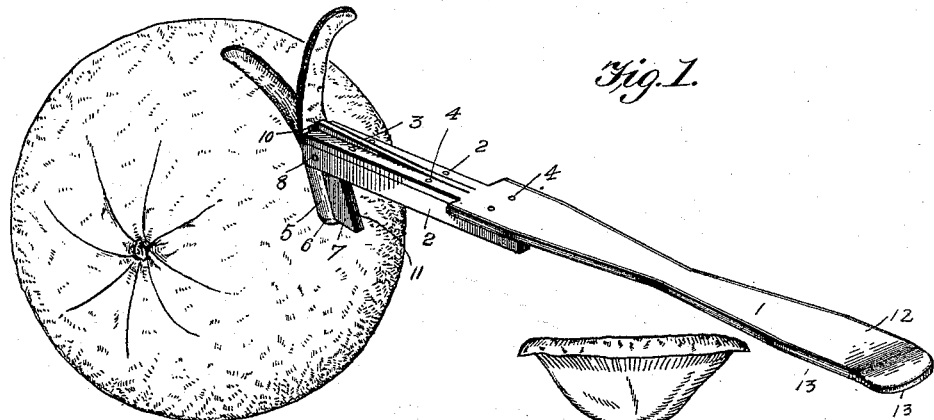
Figure 4:
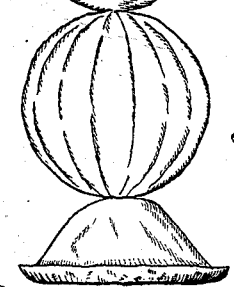
Figure 2:
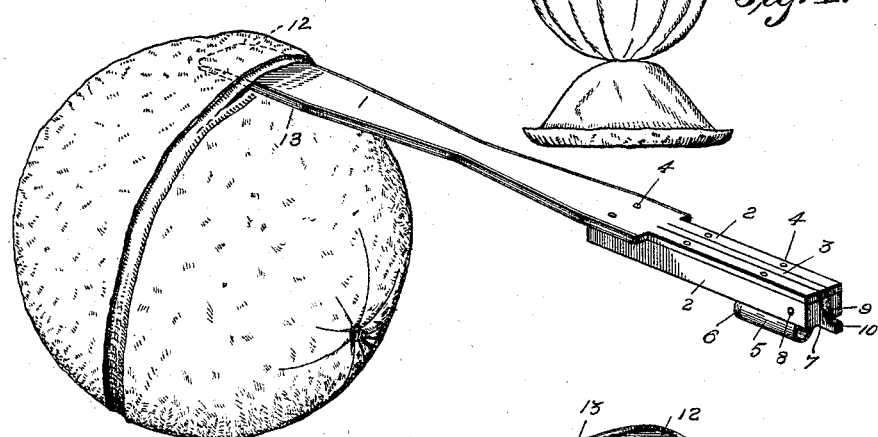
Figure 5:
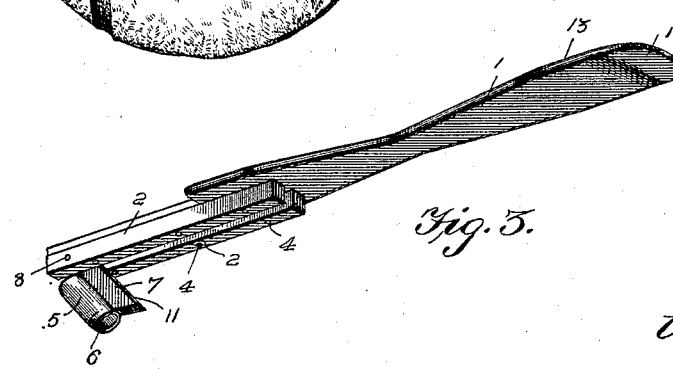

In the accompanying drawings, Figure 1 is a perspective view of my improved combination-knife shown applied to an orange in position for cutting the annular groove or kerf. Fig. 2 is a similar view, but showing the device in position for separating the rind from the pulp and showing also the manner of closing the tubular cutter. Fig. 3 is a perspective view of the complete device. Fig. 4 shows the manner in which the rind of the orange may be turned back to form a stand for the fruit or a handle by which the same may be held between the fingers while eating, and which also serves to catch the surplus or overflowing juice.

Similar numerals of reference indicate corresponding parts in the figures of the drawings.

Referring to the drawings, 1 indicates a suitable handle, preferably of metal, which is bifurcated at one end, or provided with two parallel arms 2—2, of a length sufficient to adapt them to receive between them a flat spring 3, the purpose of which will appear. Where the arms 2 are separated from the handle 1, it is preferred to extend them sufficiently beneath said handle 1 to be securely riveted thereto, as shown at 4—4.

5 indicates my improved tubular or hollow cylindrical cutter, which is preferably made from a piece of small gage tubing sharpened at the lower edge thereof, or provided with a cutting edge 6, as shown. The tubular cutter 5 is provided with a gage 7, extending laterally from one side thereof and upward therefrom. Said gage is made longer than the tubular cutter, and extending upwardly beyond the same, it passes between the parallel arms 2 of the handle 1 and is pivoted therein by means of a pin 8. At a point intermediate of the arms 2—2, the upper portion of the gage 7 is provided with a shoulder 9, and a spur or stop 10. The spring 3 bears at its outer end against the face 11 of the gage 7, when the tubular cutter and its gage are folded and upon the shoulder 9, and against the stop 10, when said cutter and its gage are thrown open, the spring thus acting to hold the cutter and gage either open or closed. Upon the opposite end of the handle 1 is provided a curved extension 12, provided with rounded edges 13. In operation, the tubular cutter 5 is first carried around the orange and an annular groove or kerf cut into and through said rind, the depth of cut being regulated by preserving a uniform distance between the rind and the lower edge or point of the gage 7. The gage 7 will prevent the groove or kerf from going beyond a certain depth. After this operation, the curved extension 12 is inserted beneath the rind, and by moving the same around the orange, the rind is separated from the pulp.

The combined knife and peeler may be formed from a single piece of metal, with the exception of the tubular cutter and its gage. The handle with its bifurcated end or the parallel arms 2, and the curved extension 12 may be cast in one piece, and the spring 3 secured thereto in any usual or preferred manner. The handle 1, grooved extension 12, arms 2, and spring 3 may all be formed from a single piece of sheet steel, and stamped into proper shape for receiving the tubular cutter and its gage. The device may, however, be constructed in any preferred manner and from any desired material, according to the desire of the manufacturer, and without departing from the spirit or sacrificing any of the advantages of this invention.

Having thus described my invention, what I claim is—

1. A fruit knife for oranges, lemons, &c., comprising a handle and a tubular or hollow cylindrical cutter disposed at an angle thereto, substantially as described.

2. A fruit knife for oranges, lemons, &c., comprising a suitable handle, a tubular or hollow cylindrical cutter, pivoted so as to be capable of being disposed at an angle thereto and a gage for regulating the depth of cut thereof, substantially as and for the purpose specified.

3. A fruit knife comprising a suitable handle, a tubular or hollow cylindrical cutter pivoted thereto, a gage for regulating the depth of the cut thereof, and a spring for holding said tubular cutter open or closed, substantially as described.

4. A fruit knife comprising a handle, a tubular or hollow cylindrical cutter pivoted thereto, a gage for regulating the depth of cut thereof, a spring for holding said cutter open or closed, and a curved extension of said handle for separating the rind from the pulp, all arranged and adapted to operate in the manner specified.

5. In a fruit knife, a handle having a bifurcated end, or provided with two parallel arms for the reception of and in combination with a tubular or hollow cylindrical cutter pivoted thereto, and a spring lying between said parallel arms for holding said handle open or closed, substantially as and for the purpose specified.

In testimony that I claim the foregoing as my own I have hereto affixed my signature in the presence of two witnesses.

WILLIAM STORRS COOPER.

Witnesses:
   MARY J. RODERICK,
   CHAS. H. KOEHNE, Jr.